United States Patent
Lohe et al.

(10) Patent No.: US 11,858,376 B2
(45) Date of Patent: *Jan. 2, 2024

(54) SYSTEM FOR MONITORING A BATTERY SYSTEM IN-FLIGHT AND A METHOD FOR ITS USE

(71) Applicant: BETA AIR, LLC, South Burlington, VT (US)

(72) Inventors: Braedon Lohe, South Burlington, VT (US); Cullen Jemison, South Burlington, VT (US); Andrew Giroux, South Burlington, VT (US); Tom Michael Hughes, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,745

(22) Filed: Jan. 26, 2023

(65) Prior Publication Data

US 2023/0302956 A1     Sep. 28, 2023

Related U.S. Application Data

(63) Continuation of application No. 17/704,682, filed on Mar. 25, 2022, now Pat. No. 11,597,295.

(51) Int. Cl.
*B60L 58/10* (2019.01)
*B60L 3/04* (2006.01)
*G06N 5/022* (2023.01)

(52) U.S. Cl.
CPC ............... *B60L 58/10* (2019.02); *B60L 3/04* (2013.01); *G06N 5/022* (2013.01); *B60L 2200/10* (2013.01)

(58) Field of Classification Search
CPC .......... B60L 58/10; B60L 3/04; B60L 2200/10
See application file for complete search history.

(56) References Cited

U.S. PATENT DOCUMENTS 4,968,942 A * 11/1990 Palanisamy .......... G01R 31/379
324/427
9,484,604 B2   11/2016 Schaffner et al.
(Continued)

FOREIGN PATENT DOCUMENTS

WO   2019172060   9/2019
WO   2020044134   3/2020

OTHER PUBLICATIONS

Michal Podhradsky • Calvin Coopmans • Austin Jensen, Battery State-Of-Charge Based Altitude Controller for Small, Low Cost Multirotor Unmanned Aerial Vehicles, Oct. 2, 2013.

*Primary Examiner* — Gertrude Arthur Jeanglaude
(74) *Attorney, Agent, or Firm* — Caldwell Intellectual Property Law

(57) ABSTRACT

In an aspect, a system for monitoring a battery system in-flight. The system includes at least a battery pack and a pack monitoring unit (PMU) communicatively connected with a battery pack. The battery pack includes a plurality of battery packs. The PMU may include at least a sensor and a controller. At least a sensor is configured to detect battery datum. A controller is communicatively connected with at least a sensor. A controller is configured to receive battery datum, detect a significant event as a function of battery datum, and transmit the significant event to a remote device.

38 Claims, 7 Drawing Sheets

(56) References Cited

U.S. PATENT DOCUMENTS

| | | |
|---|---|---|
| 9,650,138 B2 | 5/2017 | Yates |
| 9,989,595 B1 | 6/2018 | Wang et al. |
| 10,131,246 B2 | 11/2018 | Demont |
| 10,322,824 B1 | 6/2019 | Demont et al. |
| 10,328,805 B1 | 6/2019 | Wyrobek et al. |
| 10,577,121 B2 | 3/2020 | Enke et al. |
| 10,643,406 B2 | 5/2020 | Arya et al. |
| 10,797,499 B2 | 10/2020 | Zhao et al. |
| 10,822,082 B2 | 11/2020 | Hanna et al. |
| 10,960,785 B2 | 3/2021 | Villanueva et al. |
| 11,111,033 B1 | 9/2021 | Burks et al. |
| 11,133,534 B2 | 9/2021 | Kirleis et al. |
| 11,597,295 B1 * | 3/2023 | Lohe ................... B60L 58/12 |
| 11,618,331 B1 * | 4/2023 | Wiegman ............. B64F 1/362 |
| | | 701/3 |
| 2015/0336677 A1 | 11/2015 | Smaoui et al. |
| 2017/0072812 A1 | 3/2017 | Von Novak et al. |
| 2020/0274386 A1 | 8/2020 | Kirleis et al. |
| 2021/0309122 A1 | 10/2021 | Wake et al. |

* cited by examiner

SYSTEM FOR MONITORING A BATTERY SYSTEM IN-FLIGHT AND A METHOD FOR ITS USE

CROSS-REFERENCE TO RELATED APPLICATIONS

This application is a continuation of Non-provisional application Ser. No. 17/704,682 filed on Mar. 25, 2022, and entitled "SYSTEM FOR MONITORING A BATTERY SYSTEM IN-FLIGHT AND A METHOD FOR ITS USE," the entirety of which is incorporated herein by reference.

FIELD OF THE INVENTION

The present invention generally relates to the field of electric aircrafts. In particular, the present invention is directed to a system for monitoring a battery system in-flight and a method for its use.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of energy source solutions.

SUMMARY OF THE DISCLOSURE

In an aspect a system for monitoring a battery system in-flight. The system includes at least a battery pack and a pack monitoring unit (PMU) communicatively connected with a battery pack. The battery pack includes a plurality of battery packs. The PMU may include at least a sensor and a controller. At least a sensor is configured to detect battery datum. A controller is communicatively connected with at least a sensor. A controller is configured to receive battery datum, detect a significant event as a function of battery datum, and transmit the significant event to a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for monitoring a battery system in-flight. In an embodiment, the system is configured to use a pack monitoring unit (PMU) to monitor a battery pack. A PMU may use a sensor to detect when a significant event has occurred as a function of battery datum. Aspects of the present disclosure can be used to transmit significant event datum to a remote device. A battery pack may also be in electronic communication with a module management unit (MMU). A MMU may be configured to detect the strength of charge of the battery. Exemplary embodiments illustrating aspects of the present disclosure are described below in the context of several specific examples.

Figure 1:
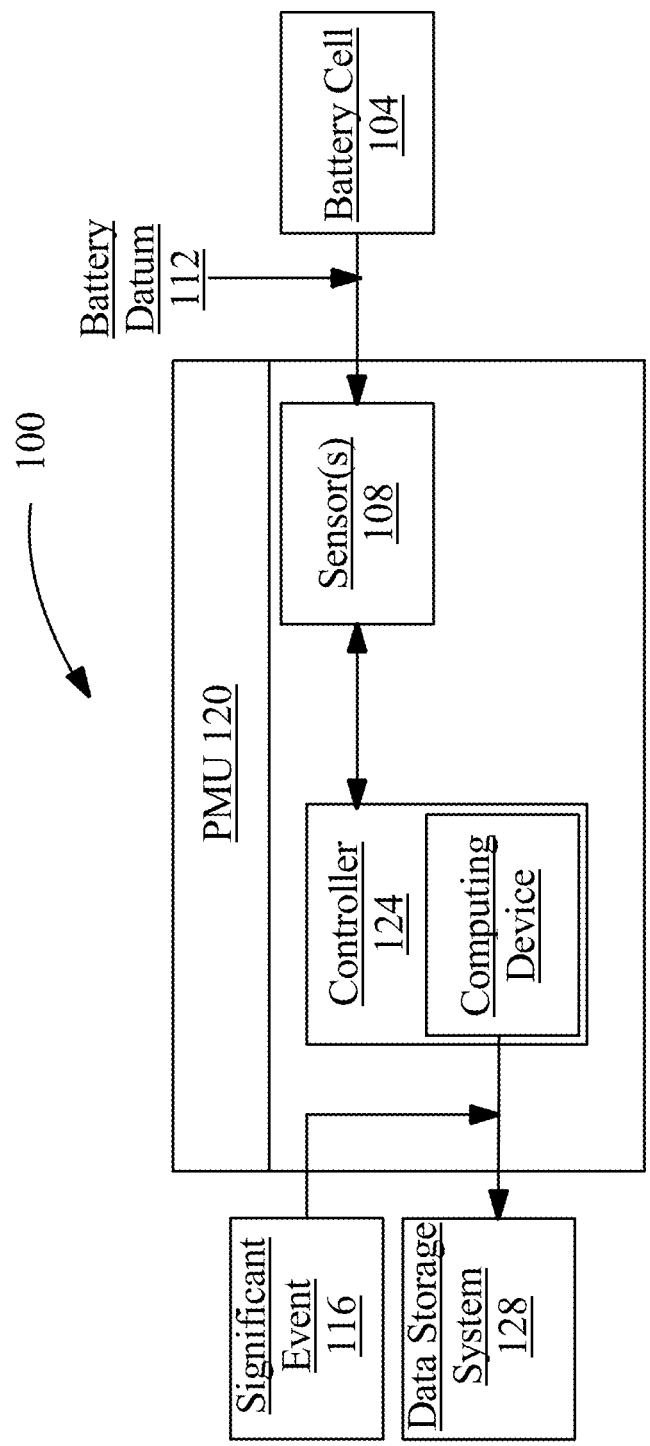
FIG. 1 is a block diagram depicting an exemplary system for monitoring a battery system in-flight.

Referring now to the drawings, FIG. 1 illustrates an embodiment of to a system for monitoring a battery system in-flight system 100. System 100 may include a plurality of battery modules 104. A "battery module" contains plurality of battery cells that have been wired together in series, parallel, or a combination of series and parallel, wherein the "battery module" holds the battery cells in a fixed position. Battery module 104 may be consistent with any battery module disclosed in U.S. application Ser. No. 17/404,500, filed on Aug. 17, 2021, and entitled "STACK BATTERY PACK FOR ELECTRIC VERTICAL TAKE-OFF AND LANDING AIRCRAFT," or U.S. application Ser. No. 17/475,743, filed on Sep. 15, 2021, and entitled "BATTERY SYSTEM AND METHOD OF AN ELECTRIC AIRCRAFT WITH SPRING CONDUCTORS," the entirety of both applications is hereby incorporated by reference.

With continued reference to FIG. 1, battery module includes an electrochemical cell. For the purposes of this disclosure, an "electrochemical cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. In some embodiments, battery module 104 may include cylindrical battery cells. For the purposes of this disclosure, cylindrical battery cells are round battery cells that have a larger height than diameter.

With continued reference to FIG. 1, battery module 104 may include pouch cell. As used in this disclosure, "pouch cell" is any battery cell or module that includes a pocket. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as LiPF6. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive tabs of a battery cell. A "conductive tab" as used in this disclosure is any protruding component capable of carrying a current.

With continued reference to FIG. 1, battery cells may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells may include lead-based batteries such as without limitation lead acid batteries and lead carbon batteries. Battery cells may include lithium sulfur batteries, magnesium ion batteries, and/or sodium ion batteries. Battery cells may include solid state batteries or supercapacitors or another suitable energy source. Persons skilled in the art, upon reviewing the entirety of this disclosure, will be aware of various devices of components that may be used as a battery cell. Battery module may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948, and 16/590,496 respectively; the entirety of both applications are incorporated herein by reference.

With continued reference to FIG. 1, battery module 104 may include a battery module 104 may include a sensor. A sensor may be coupled to battery cells. In some embodiments, a sensor may be mechanically and/or electrically coupled to battery cells. A sensor may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery cells measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a system and/or a user to detect phenomenon is maintained and in a non-limiting example, a user alter aircraft usage pursuant to sensor readings.

With continued reference to FIG. 1, battery module 104 may include a bus element. For the purposes of this disclosure, a "bus element" is an electrically conductive pathway connecting at least a component in a system configured to convey electrical energy between components. Bus element may include one or more electrically conductive pathways configured to transfer electrical energy across the pathways to convey electrical energy from one component to one or more other components. Bus element may include a ring bus. Bus element may be implemented as disclosed in U.S. application Ser. No. 17/348,240, filed on Jun. 15, 2021, titled "System and Method for Dynamic Excitation of an Energy Storage Element Configured for Use in an Electric Aircraft," the entirety of which is hereby incorporated by reference. For the purpose of this disclosure, a "ring bus" is a bus element wherein circuit breakers are connected to form a ring with isolators on both sides of each circuit breaker. Ring bus may include a component configured to isolate a fault by tripping two circuit breakers while all other circuits remain in service; such a component may include a cross tie element as described in this disclosure.

With continued reference to FIG. 1, at least a sensor 108 may be configured to detect battery datum 112. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. In one or more embodiments, and without limitation, sensor 108 may include a plurality of sensors. In one or more embodiments, and without limitation, sensor 108 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 108 may be a contact or a non-contact sensor. In one or more embodiments, sensor 108 may transmit/receive signals to/from a computing device. Signals may include electrical, electromagnetic, visual, audio, radio waves, or another undisclosed signal type alone or in combination.

With continued reference to FIG. 1, at least a sensor may include one or more sensors and may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. For example, and without limitation, sensor 108 may detect and/or measure a battery datum 112, such as a temperature, of battery module 104

With continued reference to FIG. 1, a sensor 108 may include a humidity sensor. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A humidity sensor may include a psychrometer. A humidity sensor may include a hygrometer. A humidity sensor may be configured to act as or include a humidistat. A "humidistat", for the purposes of this disclosure, is a humidity-triggered switch, often used to control another electronic device. A humidity sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell. A sensor 108 may include a multimeter. A multimeter may be configured to measure voltage across a component, electrical current through a component, and resistance of a component. A multimeter may include separate sensors to measure each of the previously disclosed electrical characteristics such as voltmeter, ammeter, and ohmmeter, respectively.

With continued reference to FIG. 1, a sensor 108 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. For instance, and without limitation, a sensor may be configured to determine that a charge level of a battery cell is high based on a detected voltage level of that battery cell or portion of the battery pack. A sensor 108 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. A sensor 108 may include digital sensors, analog sensors, or a combination thereof. A sensor may include digital-to-analog converters (DAC), analog-to-digital converters (ADC, A/D, A-to-D), a combination thereof.

With continued reference to FIG. 1, a sensor 108 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within a sensor 108, may be measured in Fahrenheit (° F.), Celsius (° C.), Kelvin (° K), or another scale alone or in combination. A temperature measured by sensors may comprise electrical signals which are transmitted to their appropriate destination wireless or through a wired connection.

With continued reference to FIG. 1, a sensor 108 may include a sensor configured to detect a Significant Event 116. "Significant Event", for the purposes of this disclosure, refers to a condition of a battery cell, which causes the battery datum 112 to be outside a predetermined range. Significant Event 116 may include a failure and/or critical operating condition of a battery pack and/or components thereof that may be harmful to the battery pack and/or corresponding electric aircraft 108. In one or more embodiments, a significant event 116 may include an overcurrent, undercurrent, overvoltage, overheating, high moisture levels, byproduct presence, low SOC, high DOD, or the like. Significant event 116 is also any event that leaves a battery cell inoperable for its designed function, namely providing electrical energy to at least a portion of an electric aircraft. Byproducts of significant event 116 may include gaseous discharge including oxygen, hydrogen, carbon dioxide, methane, carbon monoxide, a combination thereof, or another undisclosed gas, alone or in combination. Further, a sensor may be configured to detect vent gas from electrochemical cells that may comprise a gas detector. For the purposes of this disclosure, a "gas detector" is a device used to detect a gas is present in an area. Gas detectors, and more specifically, the gas sensor that may be used in a sensor, may be configured to detect combustible, flammable, toxic, oxygen depleted, a combination thereof, or another type of gas alone or in combination. A gas sensor that may be present in a sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. A sensor may include sensors that are configured to detect non-gaseous byproducts of significant event 116 including, in non-limiting examples, liquid chemical leaks including aqueous alkaline solution, ionomer, molten phosphoric acid, liquid electrolytes with redox shuttle and ionomer, and salt water, among others. A sensor may include sensors that are configured to detect non-gaseous byproducts of significant event 116 including, in non-limiting examples, electrical anomalies as detected by any of the previous disclosed sensors or components.

With continued reference to FIG. 1, system 100 includes Data storage system 128. Data storage system 128 is configured to store a plurality of battery data analysis 120. Data storage system 128 may include a solid-state memory or tape hard drive. Data storage system 128 is communicatively coupled to controller 124 and configured to receive electrical signals related to physical or electrical phenomenon measured and store those electrical signals. Alternatively, Data storage system 128 may include more than one discrete data storage systems that are physically and electrically isolated from each other.

With continued reference to FIG. 1, Data storage system 128 may include a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Referring again to FIG. 1, Data storage system 128 may store a significant event 116. Data storage system 128 may be communicatively coupled to sensors that are configured to significant event 116. Additionally or alternatively, Data storage system 128 may be communicatively coupled to a sensor suite consistent with this disclosure to measure physical and/or electrical characteristics. In embodiments, Data storage system 128 may be configured to store significant events, averages of battery datum 112 analysis, outlier events, alarms, and other incidents regarding a battery. Data storage system 128 may be configured to store significant events wherein at least a portion of the data includes significant Event 116 history. Battery maintenance history of the battery may include mechanical failures and technician resolutions thereof, electrical failures and technician resolutions thereof. Additionally, battery maintenance history may include component failures such that the overall system still functions.

Referring again to FIG. 1, Data storage system 128 may store significant events remotely. Data storage system 128 may be located on the electric vehicle or in a remote location. As used in this disclosure, "remote" is a spatial separation between two or more elements, systems, components, or devices. Stated differently, two elements may be remote from one another if they are physically spaced apart. For example, and without limitation, Data storage system 128 may transmit an alert to a user interface, such as a display, of an electric aircraft to indicate to a user that a significant event 116 has been determined. In one or more embodiments, Data storage system 128 may also use transmit an alert to a remote user device, such as a laptop, mobile device, tablet, or the like.

Referring again to FIG. 1, Data storage system 128 may store significant events locally. Data storage system 128 may be located on, adjacent, or otherwise with battery cell 104. For example, in some cases, data storage system 128 may be located with or within a battery pack and/or battery module. As used in this disclosure, "local" is an attributive indicating a spatial colocation between two or more elements, systems, components, or devices. Stated differently, two elements may be local with one another if they are physically integrated, adjacent, or proximal. For example, and without limitation, Data storage system 128 may store an alert at a location collocated with battery cell 104 when battery pack is uninstalled; and the data storage system 128 may communicate the alert prior to or after a subsequent installation.

Referring again to FIG. 1, Data storage system 128 may include non-volatile storage. As used in the current disclosure, a "non-volatile storage" is a type of data storage that can retain stored information even after power is removed. In embodiments, non-volatile memory may refer to storage in semiconductor memory chips, which store data in floating-gate memory cells consisting of floating-gate MOSFETs (metal-oxide-semiconductor field-effect, transistors), including flash memory storage such as NAND flash and solid-state drives (SSD). In other embodiments, non-volatile memory may include read-only memory (ROM), EPROM (erasable programmable ROM) and EEPROM (electrically erasable programmable ROM), ferroelectric RAM, computer data storage devices (e.g. disk storage, hard disk drives, optical discs, floppy disks, and magnetic tape), and early computer storage methods such as punched tape and cards.

Other examples of with continued reference to FIG. 1, transmitting a significant event 116 may trigger a shutdown protocol. As used in the current disclosure, "shut down protocol" is a protocol that prompts local mitigation actions to prevent electrical damage to the battery and other electrical components. The shutdown protocol may also include any method of instantaneous shutdown of high voltage currents. In embodiments shut down protocol may trigger a pyro fuse that instantaneously shuts down high voltage currents. As used in the current disclosure, a "pyro fuse" is a high voltage positive battery terminal fuse which explodes and disconnects the electrical connection irreversibly to avoid short circuit or electrical damage when a significant event 116 occurs. In other embodiments, shut down protocol may prompt the batteries to sever electric communication with other the electrical components as a function of significant event 116.

Still referring to FIG. 1, battery pack 104 includes a pack monitoring unit (PMU) 120. PMU 120 may be configured to collect a battery datum 112 of the battery pack 104. PMU may be communicatively connected to a controller. For the purposes of this disclosure, a "battery datum" is a datum describing a detected electrical input, physical input, and/or phenomenon related to a state of a battery pack. A state of a battery pack may include detectable information related to, for example, a temperature, a moisture level, a humidity, a voltage, a current, vent gas, vibrations, chemical content, state of charge, battery health, or other measurable characteristics of battery pack 104 or components thereof, such as battery module 104. In one or more embodiments, a condition state of battery pack 104 may include a condition state of a battery module 104. Additional disclosure related to a pack monitoring system can be found in U.S. patent application Ser. No. 17/529,583 entitled "PACK MONITORING UNIT FOR AN ELECTRIC AIRCRAFT BATTERY PACK AND METHODS OF USE FOR BATTERY MANAGEMENT", entirety of which in incorporated herein by reference.

With continued reference to FIG. 1, PMU 120 is configured to receive battery datum 112 from sensor 108. PMU 120 may be configured to process battery datum 112. In some embodiments, PMU 120 may not include sensor 108, but the sensor 108 may be communicatively connected to the PMU 120. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. PMU 120 may include a sensor suite having a plurality of sensors. In one or more embodiments, PMU 120 may be integrated into battery pack 104 in a portion of battery pack 104 or a subassembly thereof. One of ordinary skill in the art will appreciate that there are various areas in and on a battery pack and/or subassemblies thereof that may include PMU 120 In one or more embodiments, PMU 120 may be disposed directly over, adjacent to, facing, and/or near a battery module and specifically at least a portion of a battery cell.

Still referring to FIG. 1, in one or more embodiments, PMU 120 may include and/or be communicatively connected to a module monitor unit (MMU), which may be mechanically connected and communicatively connected to battery module. In one or more embodiments, MMU may be communicatively connected to sensor 108 and configured to receive battery datum 112 from sensor 108. MMU may then be configured to transmit battery datum 112 and/or information based on battery datum to PMU 120. PMU 120 may include and/or be communicatively connected to a controller, which is configured to receive battery datum 112 and/or information based on battery datum from PMU 120. PMU 120 may include a plurality of PMUs to create redundancy so that, if one PMU fails or malfunctions, another PMU may still operate properly. In some embodiments, PMU 120 *a* may be connected to one or more of sensor 108 and PMU 120 *b* may be connected to other one or more of sensor 108 to create redundancies in case of sensor failure. Additional disclosure related to a module monitoring system can be found in U.S. patent application Ser. No. 17/529,447 entitled "MODULE MONITOR UNIT FOR AN ELECTRIC AIRCRAFT BATTERY PACK AND METHODS OF USE", entirety of which in incorporated herein by reference.

With continued reference to FIG. 1, MMU may be configured to detect the battery life cycle datum. As used in the current disclosure, "battery life cycle datum" is a datum regarding the batteries charge cycle. A charge cycle is the process of charging a rechargeable battery and discharging it as required into a load. In general, number of cycles for a rechargeable battery indicates how many times it can undergo the process of complete charging and discharging until failure or it starting to lose capacity. In embodiments, battery life cycle datum may be used to estimate when the battery needs to be replaced. In other embodiments, battery life cycle datum maybe used to estimate how much charge a battery will be able to hold. A determination of state of charge (SOC) may be used to determine the battery life cycle datum. As a non-limiting example, the power and current draws may be from environmental conditions, components of the energy source or other factors which impact the energy source state of charge (SOC). SOC, as used herein, is a measure of remaining capacity as a function of time. SOC and/or maximum power the battery 104 can deliver may decrease during flight as the voltage decreases during discharge. SOC and/or power output capacity of an energy source may be associated with an ability of the battery to deliver energy as needed for a task such as driving a propulsor for a phase of flight such as landing, hovering, or the like. As a non-limiting example, other factors, including state of voltage, and/or estimates of state of voltage or other electrical parameters of an energy source, may be used to estimate current state of a battery 104 and/or future ability to deliver power and/or energy. Certain calculations of battery life cycle datum, state of charge, and state of voltage which may efficaciously be utilized in accordance with certain embodiments of the present disclosure are disclosed in U.S. Nonprovisional application Ser. No. 17/349,182, filed on Jun. 16, 2021, entitled "SYSTEMS AND METHODS FOR INFLIGHT OPERATION ASSESSMENT," the entirety of which is incorporated herein by reference.

With continued reference to FIG. 1, controller 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 124 may include a single computing device operating independently, or may include two or more computing device operating in concert, in parallel, sequentially or the like; two or more computing devices may be included together in a single computing device or in two or more computing devices. Controller 124 may interface or communicate with one or more additional devices as described below in further detail via a network interface device. Network interface device may be utilized for connecting controller 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 124 may include but is not limited to, for example, a computing device or cluster of computing devices in a first location and a second computing device or cluster of computing devices in a second location. Controller 124 may include one or more computing devices dedicated to data storage, security, distribution of traffic for load balancing, and the like. Controller 124 may distribute one or more computing tasks as described below across a plurality of computing devices of computing device, which may operate in parallel, in series, redundantly, or in any other manner used for distribution of tasks or memory between computing devices. Controller 124 may be implemented using a "shared nothing" architecture in which data is cached at the worker, in an embodiment, this may enable scalability of system 100 and/or computing device.

With continued reference to FIG. 1, controller 124 may be designed and/or configured to perform any method, method step, or sequence of method steps in any embodiment described in this disclosure, in any order and with any degree of repetition. For instance, controller 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 120 may be configured to calculate the target temperature of the battery as a function of the weather using a machine learning process. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce a preflight battery temperature given data provided as inputs. As used in the current disclosure, "training data," as used herein, is data containing correlations that a machine-learning process may use to model relationships between two or more categories of data. In some embodiments, the inputs into the machine learning process are weather datum and the output of the process the target temperature of the battery. In a non-limiting example, training data that may be correlated include destinations, weather datum, flight plan data, weather, and the like. In some embodiments, training data may include recorded previous flights where batteries acted within an optimal range, did not require modifications to the flight plan due to temperature issues, and did not exceed or drop below a desired temperature range. In some embodiments, training data may be generated via electronic communication between a computing device and plurality of sensors. In other embodiments, training data may be communicated to a machine learning model from a remote device. Once the flight plan machine learning process receives training data, it may be implemented in any manner suitable for generation of receipt, implementation, or generation of machine learning.

Still referring to FIG. 1, controller 124 may be configured to determine a significant event 116 using machine learning. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce a battery datum analysis given battery data provided as inputs. As used in the current disclosure, "training data," as used herein, is data containing correlations that a machine-learning process may use to model relationships between two or more categories of data. In some embodiments, the inputs into the machine learning process are a batteries life cycle datum, battery datum 112, and the battery health consideration and the output of the process will be the determination of a significant event 116. In a non-limiting example, training data that may be correlated to include battery datum such as internal resistance, capacity, voltage, self-discharge, ability to accept a charge, number of charge-discharge cycles, age of the battery, the average temperature of the battery, batteries life cycle datum, batteries health and the like. In some embodiments, training data may include datum recorded previous flights where batteries acted within an optimal range, did not require modifications to the flight plan due to battery issues. In some embodiments, training data may be generated via electronic communication between a controller and a plurality of sensors. In other embodiments, training data may be communicated to a machine learning model from a data storage system. Once the machine learning process receives training data, it may be implemented in any manner suitable for generation of receipt, implementation, or generation of machine learning.

Figure 2:
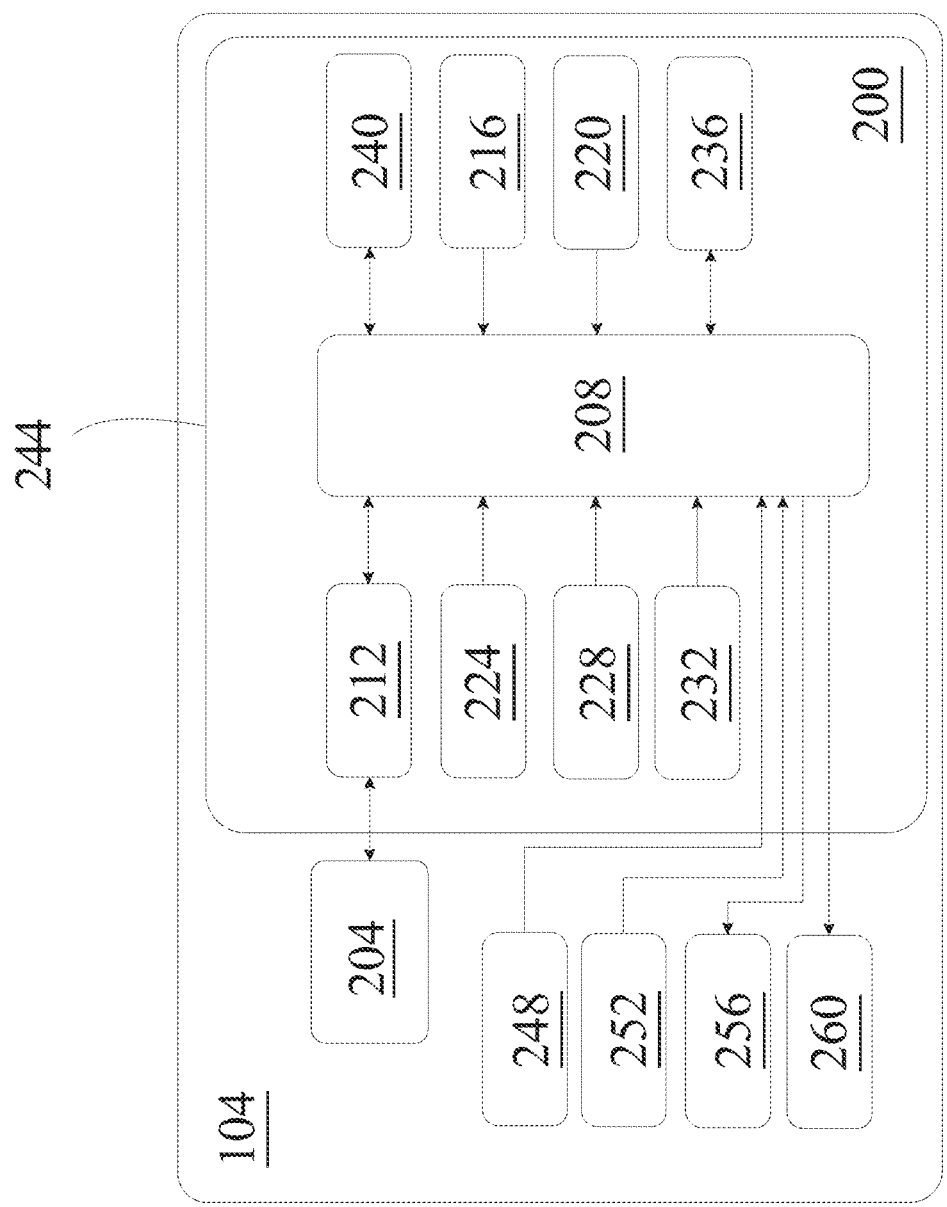
FIG. 2 is a block diagram of another exemplary embodiment a pack monitoring unit in one or more aspects of the present disclosure.

Referring now to FIG. 2, an exemplary embodiment of a PMU 200 on battery pack 104 is illustrated. PMU 200 may include sensor 108 configured to detect condition parameter and generate battery datum based on the condition parameter. In some embodiments, sensor 108 may be remote to PMU 200, for example and without limitation, a sensor of MMU 204. In one or more embodiments, condition parameter of battery pack 104 or a component of battery pack 104, such as a battery module, may be detected by sensor 108, which may be communicatively connected to MMU 204 that is incorporated in a battery module. Sensor 108 may be configured to transmit battery datum to a controller.

Still referring to FIG. 2, PMU 200 may include a controller 208. Sensor 108 may be communicatively connected to controller 208 so that sensor 108 may transmit/receive signals to/from controller 208. Signals, such as signals of sensor 108 and/or controller 208, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, controller 208 may be configured to receive battery datum from sensor 108. For example, PMU 200 may receive a plurality of measurement data from MMU 204. Similarly, PMU 120b may receive a plurality of measurement data from MMU 204b (shown in FIG. 3). In one or more embodiments, PMU 200 receives battery datum from MMU 204 via a communication component 212. In one or more embodiments, communication component 144 may be a transceiver. For example, and without limitation, communication component 144 may include an isoSPI communications interface.

With continued reference to FIG. 2, controller 208 of PMU 200 may be configured to identify an operating condition of battery module 108 as a function of battery datum. For the purposes of this disclosure, an "operating condition" is a state and/or working order of a battery pack and/or any components thereof. For example, and without limitation, an operating condition may include a state of charge (SOC), a depth of discharge (DOD), a temperature reading, a moisture/humidity level, a gas level, a chemical level, or the like. In one or more embodiments, controller 208 of PMU 200 is configured to determine a significant event if operating condition is outside of a predetermined threshold (also referred to herein as a "threshold"). For the purposes of this disclosure, a "significant event" is a failure and/or critical operating condition of a battery pack and/or components thereof that may be harmful to the battery pack and/or corresponding electric aircraft 108. In one or more embodiments, a significant event may include an overcurrent, undercurrent, overvoltage, overheating, high moisture levels, byproduct presence, low SOC, high DOD, or the like. For instance, and without limitation, if an identified operating condition, such as a temperature reading of 50° F., of a battery cell of battery pack 104, is outside of a predetermined threshold, such as 75° F. to 90° F., where 75° F. is the temperature threshold and 90° F. is the upper temperature threshold, then a significant event is determined by controller 208 of PMU 200 since 50° F. is beyond the lower temperature threshold. In another example, and without limitation, PMU 200 may use battery datum from MMU 204 to identify a temperature of 95° F. for a battery module terminal. If the predetermined threshold is, for example, 90° F., then the determined operating condition exceeds the predetermined threshold, and a significant event is determined by controller 208, such as a risk of a short at the terminal of a battery module. As used in this disclosure, a "predetermined threshold" is a limit and/or range of an acceptable quantitative value and/or combination of values such as an n-tuple or function such as linear function of values, and/or representation related to a normal operating condition of a battery pack and/or components thereof. In one or more embodiments, an operating condition outside of the threshold is a critical operating condition that indicates that a battery pack is malfunctioning, which triggers a significant event. An operating condition within the threshold is a normal operating condition that indicates that battery pack 104 is working properly and that no action is required by PMU 200 and/or a user. For example, and without limitation, if an operating condition of temperature exceeds a predetermined threshold, as described above in this disclosure, then a battery pack is considered to be operating at a critical operating condition and may be at risk of overheating and experiencing a catastrophic failure.

Still referring to FIG. 2, controller 208 of PMU 200 may be configured to generate an action command if significant event is determined by controller 208. For the purposes of this disclosure, an "action command" is a control signal generated by a controller that provides instructions related to reparative action needed to prevent and/or reduce damage to a battery back, components thereof, and/or aircraft as a result of a critical operating condition of the battery pack. Continuing the previously described example above, if an identified operating condition includes a temperature of 95° F., which exceeds predetermined threshold, then controller 208 may determine a significant event indicating that battery pack 104 is working at a critical temperature level and at risk of catastrophic failure, such as short circuiting or catching fire. In one or more embodiments, significant event s may include high shock/drop, overtemperature, undervoltage, high moisture, contactor welding, SOC unbalance, and the like. In one or more embodiments, an action command may include an instruction to terminate power supply from battery pack 104 to electric aircraft 108, power off battery pack 104, terminate a connection between one or more battery cells, initiate a temperature regulating system, such as a coolant system or opening of vents to circulate air around or through battery pack 104, or the like. In one or more embodiments, controller 208 may conduct reparative procedures via action command after determining critical even element to reduce or eliminate critical element event. For example, and without limitation, controller 208 may initiate reparative procedure of a circulation of a coolant through a cooling system of battery pack 104 to lower the temperature if a battery module if the determined temperature of the battery module exceeds a predetermined threshold. In another example, and without limitation, if a gas and/or chemical accumulation level is detected that is then determined to exceed a predetermined threshold, then high voltage disconnect may terminate power supply connection. According to some embodiments, a vent of battery pack 104 may be opened to circulate air through battery pack 104 and reduce detected gas levels. Additionally, vent of ground fault detection 304 may have a vacuum applied to aid in venting of ejecta. Vacuum pressure differential may range from 0.1"Hg to 36"Hg.

In one or more embodiments, a critical event alert may be generated by controller 208 of PMU 200 in addition to an action command. The critical event alert may include a lockout feature, which is an alert that remains even after rebooting of the battery pack and/or corresponding systems. Lockout feature may only be removed by a manual override or once the significant event has ceased and is no longer determined by controller 208. In one or more embodiments, controller 208 may continuously monitor battery pack 104 and components thereof so that an operating condition is known at all times.

With continued reference to FIG. 2, controller 208 may include a computing device, which may be implemented in any manner suitable for implementation of a computing device as described in this disclosure, a microcontroller, a logic device, a central processing unit (CPU), a microprocessor, a digital signal processor (DSP), an application specific integrated circuit (ASIC), a control circuit, a combination thereof, or the like. In one or more embodiments, output signals from various components of battery pack 104 may be analog or digital. Controller 208 may convert output signals from MMU 204, sensor 108, and/or sensors 216, 220,224,228,232 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor 108. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 200 may run state estimation algorithms. In one or more embodiments, PMU 200 may communicate with MMU 204 and/or sensor 108 via a communication component 144. For example, and without limitation, PMU 200 may communicate with MMU 204 using an isoSPI transceiver.

In one or more embodiments, controller 208 may be designed and/or configured to perform any method, method step, or sequence of method steps in any embodiment described in this disclosure, in any order and with any degree of repetition. For instance, controller 208 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 208 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, PMU 200 may include a memory component 236 configured to store data related to battery pack 104 and/or components thereof. In one or more embodiments, memory component 236 may store battery pack data. Battery pack data may include generated data, detected data, measured data, inputted data, determined data and the like. For example, battery datum from MMU 112 and or a sensor may be stored in memory component 236. In another example, significant event and/or corresponding lockout flag may be stored in memory component 236. Battery pack data may also include inputted datum, which may include total flight hours that battery pack 104 and/or electric aircraft 108 have been operating, flight plan of electric aircraft 108, battery pack identification, battery pack verification, a battery pack maintenance history, battery pack specifications, or the like. In one or more embodiments, battery pack maintenance history may include mechanical failures and technician resolutions thereof, electrical failures and technician resolutions thereof. In one or more embodiments, memory component 236 may be communicatively connected to sensors, such as sensor 108, that detect, measure, and obtain a plurality of measurements, which may include current, voltage, resistance, impedance, coulombs, watts, temperature, moisture/humidity, or a combination thereof. Additionally or alternatively, memory component 236 may be communicatively connected to a sensor suite consistent with this disclosure to measure physical and/or electrical characteristics. In one or more embodiments, memory component 236 may store the battery pack data that includes a predetermined threshold consistent with this disclosure. The moisture-level threshold may include an absolute, relative, and/or specific moisture-level threshold. Battery pack 104 may be designed to the Federal Aviation Administration (FAA)'s Design Assurance Level A (DAL-A), using redundant DAL-B subsystems.

With continued reference to FIG. 2, in one or more embodiments, memory component 236 may be configured to save battery datum, operating condition, significant event, and the like periodically in regular intervals to memory component 236. "Regular intervals", for the purposes of this disclosure, refers to an event taking place repeatedly after a certain amount of elapsed time. In one or more embodiments, PMU 200 may include a timer that works in conjunction to determine regular intervals. In other embodiments, PMU 200 may continuously update operating condition or significant event and, thus, continuously store data related the information in memory component. A timer may include a timing circuit, internal clock, or other circuit, component, or part configured to keep track of elapsed time and/or time of day. For example, in non-limiting embodiments, data storage system may save the first and second battery pack data every 30 seconds, every minute, every 30 minutes, or another time period according to timer. Additionally or alternatively, memory component 236 may save battery pack data after certain events occur, for example, in non-limiting embodiments, each power cycle, landing of electric aircraft 108, when battery pack 104 is charging or discharging, a failure of battery module, a malfunction of battery module, a significant event, or scheduled maintenance periods. In nonlimiting embodiments, battery pack 104 phenomena may be continuously measured and stored at an intermediary storage location, and then permanently saved by memory component 236 at a later time, like at a regular interval or after an event has taken place as disclosed hereinabove. Additionally or alternatively, data storage system may be configured to save battery pack data at a predetermined time. "Predetermined time", for the purposes of this disclosure, refers to an internal clock within battery pack 104 commanding memory component 236 to save battery pack data at that time.

Memory component 236 may include a solid-state memory or tape hard drive. Memory component 236 may be communicatively connected to PMU 200 and may be configured to receive electrical signals related to physical or electrical phenomenon measured and store those electrical signals as battery module data. Alternatively, memory component 236 may be a plurality of discrete memory components that are physically and electrically isolated from each other. One of ordinary skill in the art would understand the virtually limitless arrangements of data stores with which battery pack 104 could employ to store battery pack data.

Still referring to FIG. 2, PMU 200 may be configured to communicate with electric aircraft 108, such as controller 124 of electric aircraft 108 illustrated in FIG. 1, using a controller area network (CAN), such as by using a CAN transceiver 240. In one or more embodiments, controller area network may include a bus. Bus may include an electrical bus. Bus may refer to power busses, audio busses, video busses, computing address busses, and/or data busses. Bus may be additionally or alternatively responsible for conveying electrical signals generated by any number of components within battery pack 104 to any destination on or offboard electric aircraft 108. PMU 200 may include wiring or conductive surfaces only in portions required to electrically couple bus to electrical power or necessary circuits to convey that power or signals to their destinations. In one or more embodiments, PMU 200 may transmit action command via CAN transceiver 240 and/or an alert to electric aircraft 108. For example, and without limitation, PMU 200 may transmit an alert to a user interface, such as a display, of electric aircraft 108 to indicate to a user that a significant event has been determined. In one or more embodiments, PMU 200 may also use CAN transceiver 240 to transmit an alert to a remote user device, such as a laptop, mobile device, tablet, or the like.

In one or more embodiments, PMU 200 may include a housing 244. In one or more embodiments, housing 244 may include materials which possess characteristics suitable for thermal insulation, such as fiberglass, iron fibers, polystyrene foam, and thin plastic films, to name a few. Housing 244 may also include polyvinyl chloride (PVC), glass, asbestos, rigid laminate, varnish, resin, paper, Teflon, rubber, and mechanical lamina to physically isolate components of battery pack 104 from external components. In one or more embodiments, housing 244 may also include layers that separate individual components of PMU 200, such as components described above in this disclosure. As understood by one skilled in the art, housing 244 may be any shape or size suitable to attached to a battery module, such as battery module of battery pack 104. In one or more embodiments, controller 208, memory component 236, sensor 108, or the like may be at least partially disposed within housing 244.

With continued reference to FIG. 2, PMU 200 may be in communication with high voltage disconnect of battery pack 104. In one or more embodiments, high voltage disconnect may include a bus. High voltage disconnect may include a ground fault detection 248, an HV (high voltage) current sensor 252, an HV pyro fuse 256, an HV contactor 260, and the like. High voltage disconnect may physically and/or electrically breaks power supply communication between electric aircraft 108 and battery module of battery pack 104.

In one or more embodiments, in one or more embodiments, the termination of power supply connection, shown in FIG. 1, between high voltage disconnect and electric aircraft 108 may be restored by high voltage disconnect once PMU 200 no longer determined a significant event. In other embodiments, power supply connection may need to be restored manually, such as by a user. In one or more embodiments, PMU 200 may also include a switching regulator, which is configured to receive power from a battery module of battery pack 104. Thus, PMU 200 may be powered by energy by battery pack 104. Additional disclosure related to a batter management on an electric aircraft can be found in U.S. patent application Ser. No. 17/528,896 entitled "SYSTEMS AND METHODS FOR BATTERY MANAGEMENT FOR ELECTRIC AIRCRAFT BATTERIES", entirety of which in incorporated herein by reference.

Figure 3:
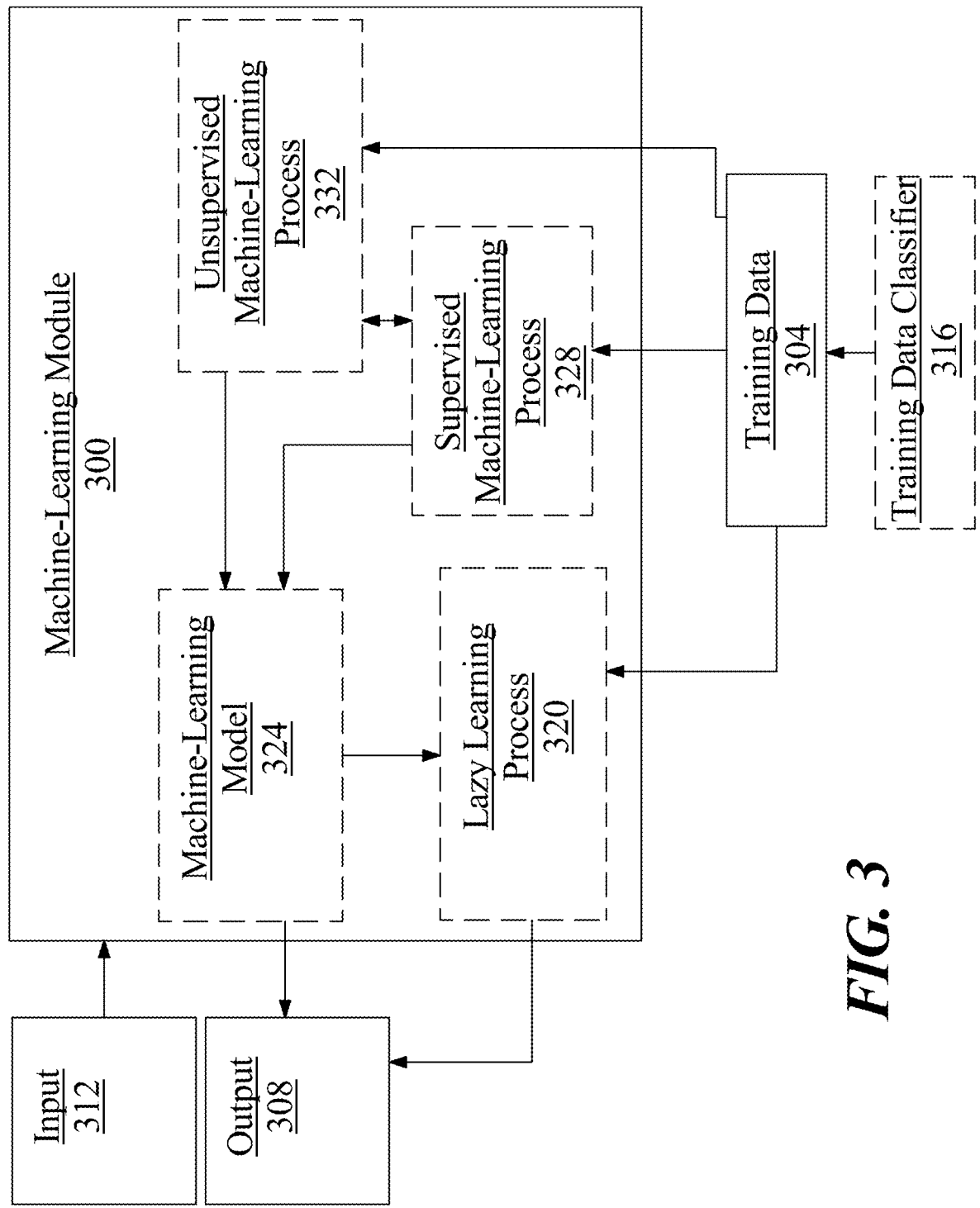
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example flight elements and/or pilot signals may be inputs, wherein an output may be an autonomous function.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1616 may classify elements of training data to sub-categories of flight elements such as torques, forces, thrusts, directions, and the like thereof.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
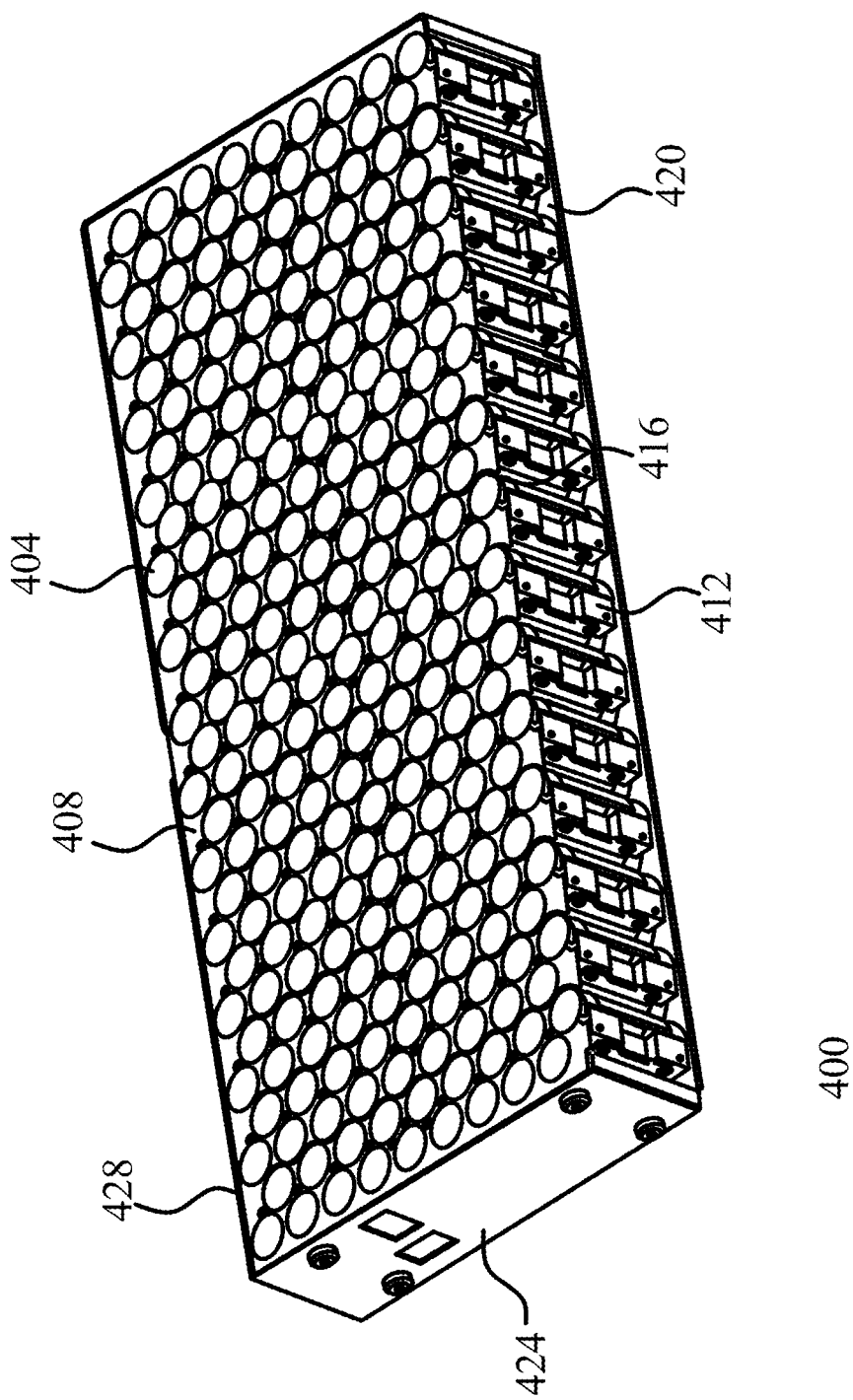
FIG. 4 is a diagrammatic representation of an exemplary embodiment of a battery module.

Still referring to FIG. 4, in embodiments, battery module 400 can include one or more battery cells 404. In another embodiment, battery module 400 comprises a plurality of individual battery cells 404. Battery cells 404 may each comprise a cell configured to include an electrochemical reaction that produces electrical energy sufficient to power at least a portion of an electric aircraft and/or a cart 100. Battery cell 404 may include electrochemical cells, galvanic cells, electrolytic cells, fuel cells, flow cells, voltaic cells, or any combination thereof—to name a few. In embodiments, battery cells 404 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 404 may use the term 'wired', but one of ordinary skill in the art would appreciate that this term is synonymous with 'electrically connected', and that there are many ways to couple electrical elements like battery cells 404 together. As an example, battery cells 404 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 404 may be wired in a series-parallel circuit which combines characteristics of the constituent circuit types to this combination circuit. Battery cells 404 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 404 and therefore cell retainer 408 openings are shifted one half-length so that no two battery cells 404 are directly next to the next along the length of the battery module 400, this is the staggered arrangement presented in the illustrated embodiment of FIG. 4. Cell retainer 408 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 408 may comprise staggered openings that align with battery cells 404 and further configured to hold battery cells 404 in fixed positions. Cell retainer 408 may comprise an injection molded component. Injection molded component may comprise a component manufactured by injecting a liquid into a mold and letting it solidify, taking the shape of the mold in its hardened form. Cell retainer 408 may comprise liquid crystal polymer, polypropylene, polycarbonate, acrylonitrile butadiene styrene, polyethylene, nylon, polystyrene, polyether ether ketone, to name a few. Cell retainer 408 may comprise a second cell retainer fixed to the second end of battery cells 404 and configured to hold battery cells 404 in place from both ends. The second cell retainer may comprise similar or the exact same characteristics and functions of first cell retainer 408. Battery module 400 may also comprise cell guide 412. Cell guide 412 includes material disposed in between two rows of battery cells 404. In embodiments, cell guide 412 can be configured to distribute heat that may be generated by battery cells 404.

According to embodiments, battery module 400 may also comprise back plate 420. Back plate 420 is configured to provide a base structure for battery module 400 and may encapsulate at least a portion thereof. Backplate 420 can have any shape and includes opposite, opposing sides with a thickness between them. In embodiments, back plate 420 may comprise an effectively flat, rectangular prism shaped sheet. For example, back plate 420 can comprise one side of a larger rectangular prism which characterizes the shape of battery module 400 as a whole. Back plate 420 also comprises openings correlating to each battery cell 404 of the plurality of battery cells 404. Back plate 420 may comprise a lamination of multiple layers. The layers that are laminated together may comprise FR-4, a glass-reinforced epoxy laminate material, and a thermal barrier of a similar or exact same type as disclosed hereinabove. Back plate 420 may be configured to provide structural support and containment of at least a portion of battery module 400 as well as provide fire and thermal protection.

According to embodiments, battery module 400 may also comprise first end cap 424 configured to encapsulate at least a portion of battery module 400. End cap 424 may provide structural support for battery module 400 and hold back plate 420 in a fixed relative position compared to the overall battery module 400. End cap 424 may comprise a protruding boss on a first end that mates up with and snaps into a receiving feature on a first end of back plate 420. End cap 424 may comprise a second protruding boss on a second end that mates up with and snaps into a receiving feature on sense board.

Battery module 400 may also comprise at least a side panel 428 that may encapsulate two sides of battery module 400. Side panel 428 may comprise opposite and opposing faces comprising a metal or composite material. In the illustrative embodiment of FIG. 4, a second side panel 428 is present but not illustrated so that the inside of battery module 400 may be presented. Side panel(s) 428 may provide structural support for battery module 400 and provide a barrier to separate battery module 400 from exterior components within aircraft or environment.

In one or more embodiments, battery cells may include pouch cells. Pouch cells may include lithium (Li) ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. In one or more embodiments pouch cells may include lead-based batteries, such as without limitation, lead acid batteries and lead carbon batteries. Pouch cells may include lithium sulfur batteries, magnesium ion batteries, and/or sodium ion batteries. Battery module 104 may include, without limitation, batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules may include solid state batteries or supercapacitors or another suitable energy source. Battery module may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. Patent App. Nos. 16/948, and 16/590,496 respectively; the entirety of both applications are incorporated herein by reference.

Figure 5:
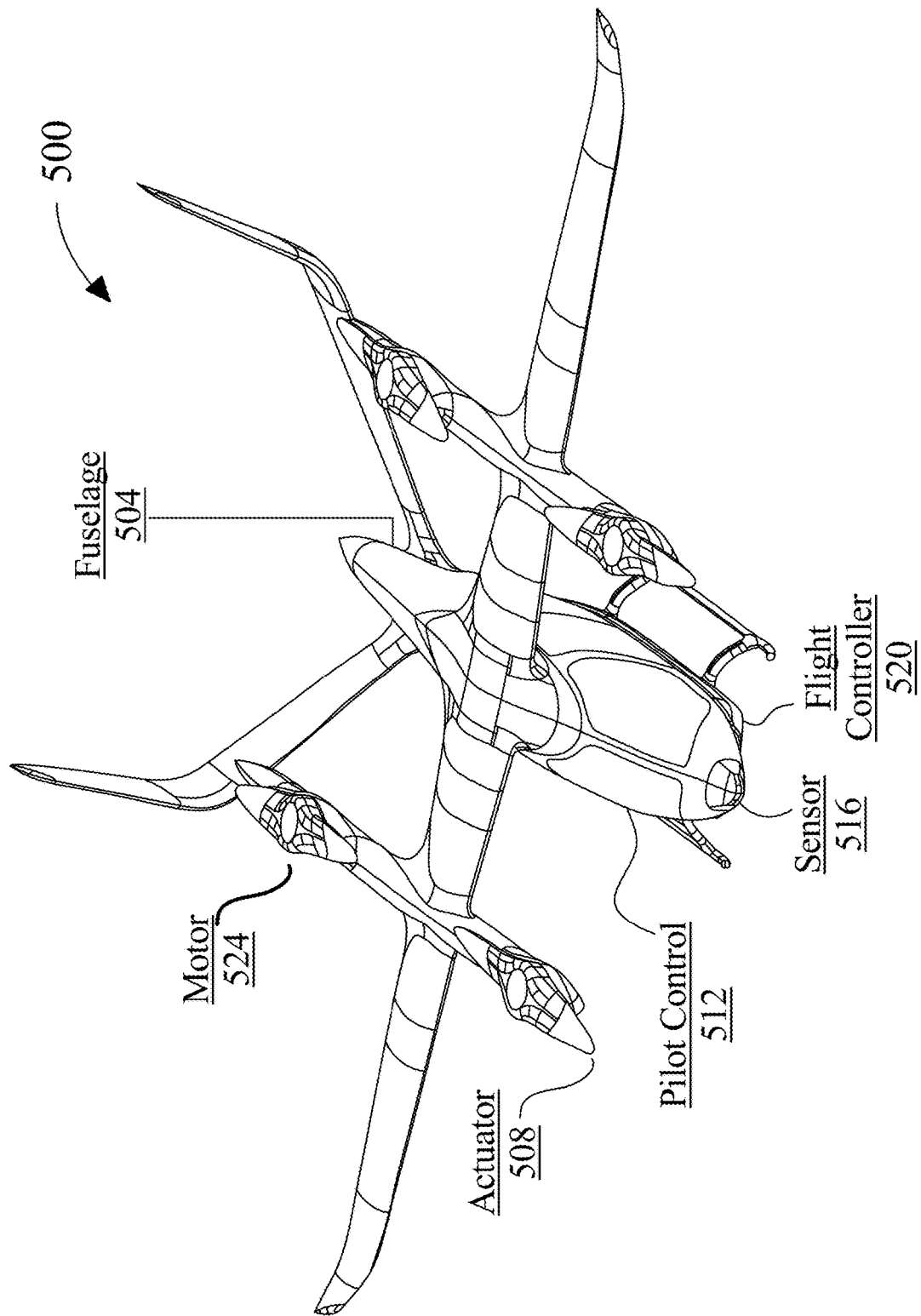
FIG. 5 is a schematic of an exemplary electric aircraft.

Referring now to FIG. 5, an exemplary embodiment of an electric aircraft 500 which may be used in conjunction with system 100 of FIG. 1. Electric aircraft 500, and any of its features, may be used in conjunction with any of the embodiments of the present disclosure. Electric aircraft 500 may include any of the aircrafts as disclosed herein including electric aircraft 124 of FIG. 1. In an embodiment, electric aircraft 500 may be an electric vertical takeoff and landing (eVTOL) aircraft. As used in this disclosure, an "aircraft" is any vehicle that may fly by gaining support from the air. As a non-limiting example, aircraft may include airplanes, helicopters, commercial, personal and/or recreational aircrafts, instrument flight aircrafts, drones, electric aircrafts, airliners, rotorcrafts, vertical takeoff and landing aircrafts, jets, airships, blimps, gliders, paramotors, quad-copters, unmanned aerial vehicles (UAVs) and the like. As used in this disclosure, an "electric aircraft" is an electrically powered aircraft such as one powered by one or more electric motors or the like. In some embodiments, electrically powered (or electric) aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Including one or more propulsion and/or flight components. Electric propulsion assembly may include any electric propulsion assembly (or system) as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 5, as used in this disclosure, a "vertical take-off and landing (VTOL) aircraft" is one that can hover, take off, and land vertically. An "electric vertical takeoff and landing aircraft" or "eVTOL aircraft," as used in this disclosure, is an electrically powered aircraft typically using an energy source, of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

Still referring to FIG. 5, electric aircraft 500, in some embodiments, may generally include a fuselage 504, a flight component 508 (or a plurality of flight components 508), a pilot control 520, an aircraft sensor 528 (or a plurality of aircraft sensors 528) and flight controller 152. In one embodiment, flight components 508 may include at least a lift component 512 (or a plurality of lift components 512) and at least a pusher component 516 (or a plurality of pusher components 516). Aircraft sensor(s) 528 may be the same as or similar to aircraft sensor(s) 160 of FIG. 1.

Still referring to FIG. 5, as used in this disclosure, a "fuselage" is the main body of an aircraft, or in other words, the entirety of the aircraft except for the cockpit, nose, wings, empennage, nacelles, any and all control surfaces, and generally contains an aircraft's payload. Fuselage 504 may include structural elements that physically support a shape and structure of an aircraft. Structural elements may take a plurality of forms, alone or in combination with other types. Structural elements may vary depending on a construction type of aircraft such as without limitation a fuselage 504. Fuselage 504 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber.

Still referring to FIG. 5, it should be noted that an illustrative embodiment is presented only, and this disclosure in no way limits the form or construction method of any of the aircrafts as disclosed herein. In embodiments, fuselage 504 may be configurable based on the needs of the aircraft per specific mission or objective. The general arrangement of components, structural elements, and hardware associated with storing and/or moving a payload may be added or removed from fuselage 504 as needed, whether it is stowed manually, automatedly, or removed by personnel altogether. Fuselage 504 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 504 may also be configurable to accept certain specific cargo containers, or a receptable that can, in turn, accept certain cargo containers.

Still referring to FIG. 5, electric aircraft 500 may include a plurality of laterally extending elements attached to fuselage 504. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground. In some embodiments, winglets may be provided at terminal ends of the wings which can provide improved aerodynamic efficiency and stability in certain flight situations. In some embodiments, the wings may be foldable to provide a compact aircraft profile, for example, for storage, parking and/or in certain flight modes.

Still referring to FIG. 5, electric aircraft 500 may include a plurality of flight components 508. As used in this disclosure a "flight component" is a component that promotes flight and guidance of an aircraft. Flight component 508 may include power sources, control links to one or more elements, fuses, and/or mechanical couplings used to drive and/or control any other flight component. Flight component 508 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. Flight component 508 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft.

Still referring to FIG. 5, in an embodiment, flight component 508 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 5, in an embodiment, plurality of flight components 508 of aircraft 500 may include at least a lift component 516 and at least a pusher component 516. Flight component 508 may include a propulsor, a propeller, a motor, rotor, a rotating element, electrical energy source, battery, and the like, among others. Each flight component may be configured to generate lift and flight of electric aircraft. In some embodiments, flight component 508 may include one or more lift components 512, one or more pusher components 516, one or more battery packs including one or more batteries or cells, and one or more electric motors. Flight component 508 may include a propulsor. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight.

Still referring to FIG. 5, in some embodiments, lift component 512 may include a propulsor, a propeller, a blade, a motor, a rotor, a rotating element, an aileron, a rudder, arrangements thereof, combinations thereof, and the like. Each lift component 512, when a plurality is present, of plurality of flight components 508 is configured to produce, in an embodiment, substantially upward and/or vertical thrust such that aircraft moves upward.

With continued reference to FIG. 5, as used in this disclosure a "lift component" is a component and/or device used to propel a craft upward by exerting downward force on a fluid medium, which may include a gaseous medium such as air or a liquid medium such as water. Lift component 512 may include any device or component that consumes electrical power on demand to propel an electric aircraft in a direction or other vehicle while on ground or in-flight. For example, and without limitation, lift component 512 may include a rotor, propeller, paddle wheel and the like thereof, wherein a rotor is a component that produces torque along the longitudinal axis, and a propeller produces torque along the vertical axis. In an embodiment, lift component 512 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 512 may include a rotating power-driven hub, to which are attached several radial airfoil-section blades such that the whole assembly rotates about a longitudinal axis. Blades may be configured at an angle of attack. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. In an embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. In an embodiment, angle of attack be configured to produce a fixed pitch angle. As used in this disclosure a "fixed pitch angle" is a fixed angle between a cord line of a blade and the rotational velocity direction. In an embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 5, lift component 512 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, lift component 512 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 508 such as a power source(s) may apply a torque on lift component 512 to produce lift.

In an embodiment and still referring to FIG. 5, a plurality of lift components 512 of plurality of flight components 508 may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 500. In another embodiment, and without limitation, the second set of lift components may be oriented along a line oriented 135° from the longitudinal axis, wherein the first set of lift components line and the second set of lift components are perpendicular to each other.

Still referring to FIG. 5, pusher component 516 and lift component 512 (of flight component(s) 508) may include any such components and related devices as disclosed in U.S. Nonprovisional application Ser. No. 16/427,298, filed on May 30, 2019, entitled "SELECTIVELY DEPLOYABLE HEATED PROPULSOR SYSTEM," U.S. Nonprovisional application Ser. No. 16/703,225, filed on Dec. 4, 2019, entitled "AN INTEGRATED ELECTRIC PROPULSION ASSEMBLY," U.S. Nonprovisional application Ser. No. 16/910,255, filed on Jun. 24, 2020, entitled "AN INTEGRATED ELECTRIC PROPULSION ASSEMBLY," U.S. Nonprovisional application Ser. No. 17/319,155, filed on May 13, 2021, entitled "AIRCRAFT HAVING REVERSE THRUST CAPABILITIES," U.S. Nonprovisional application Ser. No. 16/929,206, filed on Jul. 15, 2020, entitled "A HOVER AND THRUST CONTROL ASSEMBLY FOR DUAL-MODE AIRCRAFT,"U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," and U.S. Nonprovisional application Ser. No. 17/321,662, filed on May 17, 2021, entitled "AIRCRAFT FOR FIXED PITCH LIFT," the entirety of each one of which is incorporated herein by reference. Any aircrafts, including electric and eVTOL aircrafts, as disclosed in any of these applications may efficaciously be utilized with any of the embodiments as disclosed herein, as needed, or desired. Any flight controllers as disclosed in any of these applications may efficaciously be utilized with any of the embodiments as disclosed herein, as needed, or desired.

Still referring to FIG. 5, pusher component 516 may include a propulsor, a propeller, a blade, a motor, a rotor, a rotating element, an aileron, a rudder, arrangements thereof, combinations thereof, and the like. Each pusher component 516, when a plurality is present, of the plurality of flight components 508 is configured to produce, in an embodiment, substantially forward and/or horizontal thrust such that the aircraft moves forward.

Still referring to FIG. 5, as used in this disclosure a "pusher component" is a component that pushes and/or thrusts an aircraft through a medium. As a non-limiting example, pusher component 516 may include a pusher propeller, a paddle wheel, a pusher motor, a pusher propulsor, and the like. Additionally, or alternatively, pusher flight component may include a plurality of pusher flight components. Pusher component 516 is configured to produce a forward thrust. As a non-limiting example, forward thrust may include a force to force aircraft to in a horizontal direction along the longitudinal axis. As a further non-limiting example, pusher component 516 may twist and/or rotate to pull air behind it and, at the same time, push aircraft 500 forward with an equal amount of force. In an embodiment, and without limitation, the more air forced behind aircraft, the greater the thrust force with which the aircraft is pushed horizontally will be. In another embodiment, and without limitation, forward thrust may force aircraft 500 through the medium of relative air. Additionally or alternatively, plurality of flight components 508 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 5, as used in this disclosure a "power source" is a source that powers, drives and/or controls any flight component and/or other aircraft component. For example, and without limitation power source may include a motor that operates to move one or more lift components 512 and/or one or more pusher components 516, to drive one or more blades, or the like thereof. Motor(s) may be driven by direct current (DC) electric power and may include, without limitation, brushless DC electric motors, switched reluctance motors, induction motors, or any combination thereof. Motor(s) may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Still referring to FIG. 5, in an embodiment, aircraft 500 may include a pilot control 520. As used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 520 may include a collective, inceptor, foot bake, steering and/or control wheel, control stick, pedals, throttle levers, and the like. Pilot control 520 may be configured to translate a pilot's desired torque for each flight component of the plurality of flight components, such as and without limitation, pusher component 516 and lift component 512. Pilot control 520 may be configured to control, via inputs and/or signals such as from a pilot, the pitch, roll, and yaw of the aircraft. Pilot control may be available onboard aircraft or remotely located from it, as needed or desired.

Still referring to FIG. 5, as used in this disclosure a "collective control" or "collective" is a mechanical control of an aircraft that allows a pilot to adjust and/or control the pitch angle of plurality of flight components 508. For example and without limitation, collective control may alter and/or adjust the pitch angle of all of the main rotor blades collectively. For example, and without limitation pilot control 520 may include a yoke control. As used in this disclosure a "yoke control" is a mechanical control of an aircraft to control the pitch and/or roll. For example and without limitation, yoke control may alter and/or adjust the roll angle of aircraft 500 as a function of controlling and/or maneuvering ailerons. In an embodiment, pilot control 520 may include one or more foot-brakes, control sticks, pedals, throttle levels, and the like thereof. In another embodiment, and without limitation, pilot control 520 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft 500 to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft 500 upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 520 may be configured to modify a variable pitch angle. For example, and without limitation, pilot control 520 may adjust one or more angles of attack of a propulsor or propeller.

Still referring to FIG. 5, aircraft 500 may include at least an aircraft sensor 528. Aircraft sensor 528 may include any sensor or noise monitoring circuit described in this disclosure. Aircraft sensor 528, in some embodiments, may be communicatively connected or coupled to flight controller 152. Aircraft sensor 528 may be configured to sense a characteristic of pilot control 520. Sensor may be a device, module, and/or subsystem, utilizing any hardware, software, and/or any combination thereof to sense a characteristic and/or changes thereof, in an instant environment, for instance without limitation a pilot control 520, which the sensor is proximal to or otherwise in a sensed communication with, and transmit information associated with the characteristic, for instance without limitation digitized data. Sensor 528 may be mechanically and/or communicatively coupled to aircraft 500, including, for instance, to at least a pilot control 520. Aircraft sensor 528 may be configured to sense a characteristic associated with at least a pilot control 520. An environmental sensor may include without limitation one or more sensors used to detect ambient temperature, barometric pressure, and/or air velocity. Aircraft sensor 528 may include without limitation gyroscopes, accelerometers, inertial measurement unit (IMU), and/or magnetic sensors, one or more humidity sensors, one or more oxygen sensors, or the like. Additionally or alternatively, sensor 528 may include at least a geospatial sensor. Aircraft sensor 528 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 500 for both critical and non-critical functions. Sensor may be incorporated into vehicle or aircraft or be remote.

Still referring to FIG. 5, in some embodiments, aircraft sensor 528 may be configured to sense a characteristic associated with any pilot control described in this disclosure. Non-limiting examples of aircraft sensor 528 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, aircraft sensor 528 may sense a characteristic as an analog measurement, for instance, yielding a continuously variable electrical potential indicative of the sensed characteristic. In these cases, aircraft sensor 528 may additionally comprise an analog to digital converter (ADC) as well as any additionally circuitry, such as without limitation a Wheatstone bridge, an amplifier, a filter, and the like. For instance, in some cases, aircraft sensor 528 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 500, for instance without limitation a computing system, a pilot display, and a memory component. Alternatively or additionally, aircraft sensor 528 may sense a characteristic of a pilot control 520 digitally. For instance in some embodiments, aircraft sensor 528 may sense a characteristic through a digital means or digitize a sensed signal natively. In some cases, for example, aircraft sensor 528 may include a rotational encoder and be configured to sense a rotational position of a pilot control; in this case, the rotational encoder digitally may sense rotational "clicks" by any known method, such as without limitation magnetically, optically, and the like. Aircraft sensor 528 may include any of the sensors as disclosed in the present disclosure. Aircraft sensor 528 may include a plurality of sensors. Any of these sensors may be located at any suitable position in or on aircraft 500.

With continued reference to FIG. 5, in some embodiments, electric aircraft 500 includes, or may be coupled to or communicatively connected to, flight controller 152 which is described further with reference to FIG. 3. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. Flight controller 152, in an embodiment, is located within fuselage 504 of aircraft. In accordance with some embodiments, flight controller is configured to operate a vertical lift flight (upwards or downwards, that is, takeoff or landing), a fixed wing flight (forward or backwards), a transition between a vertical lift flight and a fixed wing flight, and a combination of a vertical lift flight and a fixed wing flight.

Still referring to FIG. 5, in an embodiment, and without limitation, flight controller 152 may be configured to operate a fixed-wing flight capability. A "fixed-wing flight capability" can be a method of flight wherein the plurality of laterally extending elements generate lift. For example, and without limitation, fixed-wing flight capability may generate lift as a function of an airspeed of aircraft 500 and one or more airfoil shapes of the laterally extending elements. As a further non-limiting example, flight controller 152 may operate the fixed-wing flight capability as a function of reducing applied torque on lift (propulsor) component 512. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference. Flight controller 152 may efficaciously include any flight controllers as disclosed in U.S. Nonprovisional application Ser. No. 17/106,557, filed on Nov. 30, 2020, and entitled "SYSTEM AND METHOD FOR FLIGHT CONTROL IN ELECTRIC AIRCRAFT."

In an embodiment, and still referring to FIG. 5, flight controller 152 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155. Flight controller 152 may efficaciously include any flight controllers as disclosed in U.S. Nonprovisional application Ser. No. 17/319,155, filed on May 13, 2021, and entitled "AIRCRAFT HAVING REVERSE THRUST CAPABILITIES".

In an embodiment, and still referring to FIG. 5, flight controller 152 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of the plurality of lift components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCAFT," the entirety of which is incorporated herein by reference. Flight controller 152 may efficaciously include any flight controllers as disclosed in U.S. Nonprovisional App. Ser. Nos. 17/222,539 and 17/113,647.

Figure 6:
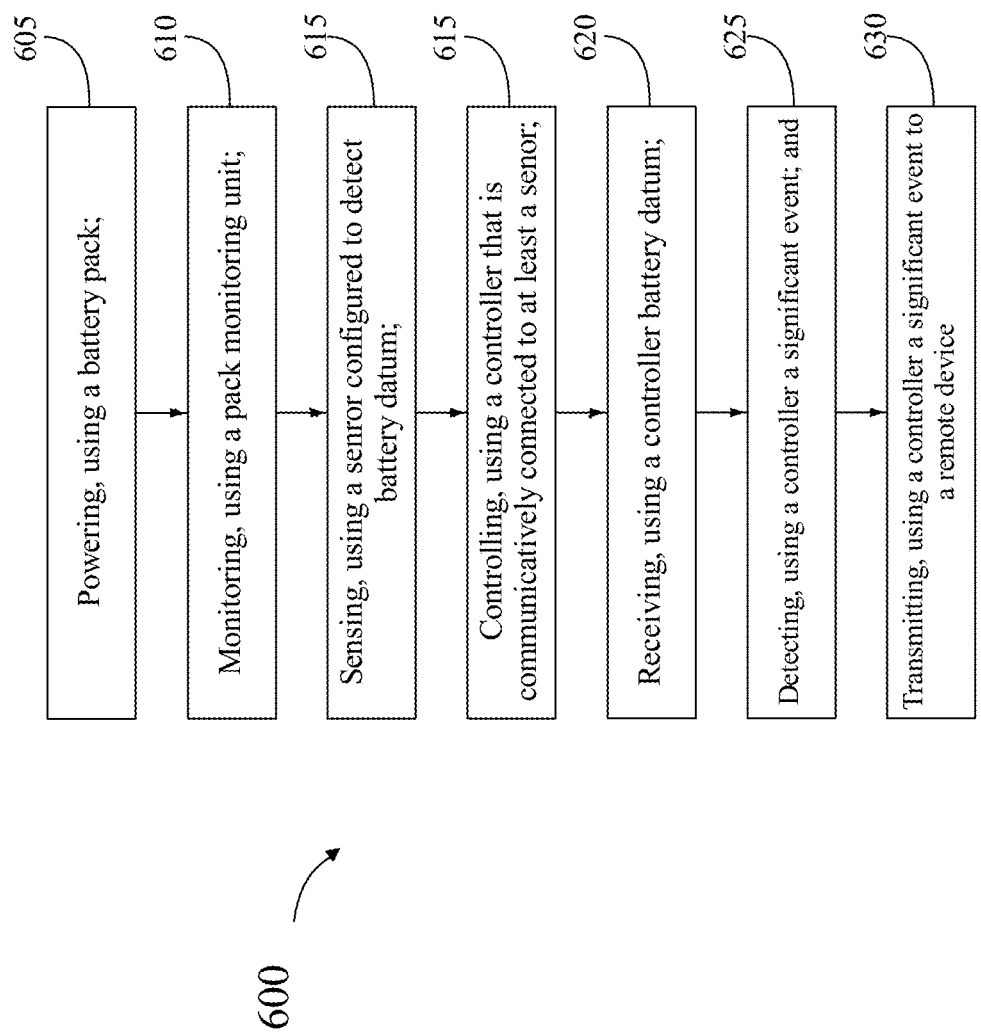
FIG. 6 a flow diagram of an exemplary embodiment of a method for monitoring a battery system in-flight.

Referring now to FIG. 6, an exemplary method 600 for transmitting battery pack data of an electric aircraft. An electric vehicle may include any electric vehicle described in this disclosure, for example with reference to FIGS. 1-7. At step 605, method 600 may include powering, using a battery pack. A battery pack may include any battery described in this disclosure, for example with reference to FIGS. 1-7.

Referring now to FIG. 6, At step 610, method 600 may include monitoring, using a pack monitoring unit. A pack monitoring unit may include any monitoring unit described in this disclosure, for example with reference to FIGS. 1-7.

Referring now to FIG. 6, At step 615, method 600 may include sensing using at least a sensor configured to detect battery datum. A sensor may include any sensor described in this disclosure, for example with reference to FIGS. 1-7. Battery datum may include any datum described in this disclosure, for example with reference to FIGS. 1-7.

Referring now to FIG. 6, At step 620, method 600 may include receiving, using a controller battery datum. A controller may include any computing device described in this disclosure, for example with reference to FIGS. 1-7.

Referring now to FIG. 6, At step 625, method 600 may include detecting, using a controller a significant event. Significant event may include any event described in this disclosure, for example with reference to FIGS. 1-7.

Referring now to FIG. 6, At step 630, method 600 may include transmitting, using a controller a significant event to a data storage device. Data storage device may include any data storage device described in this disclosure, for example with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
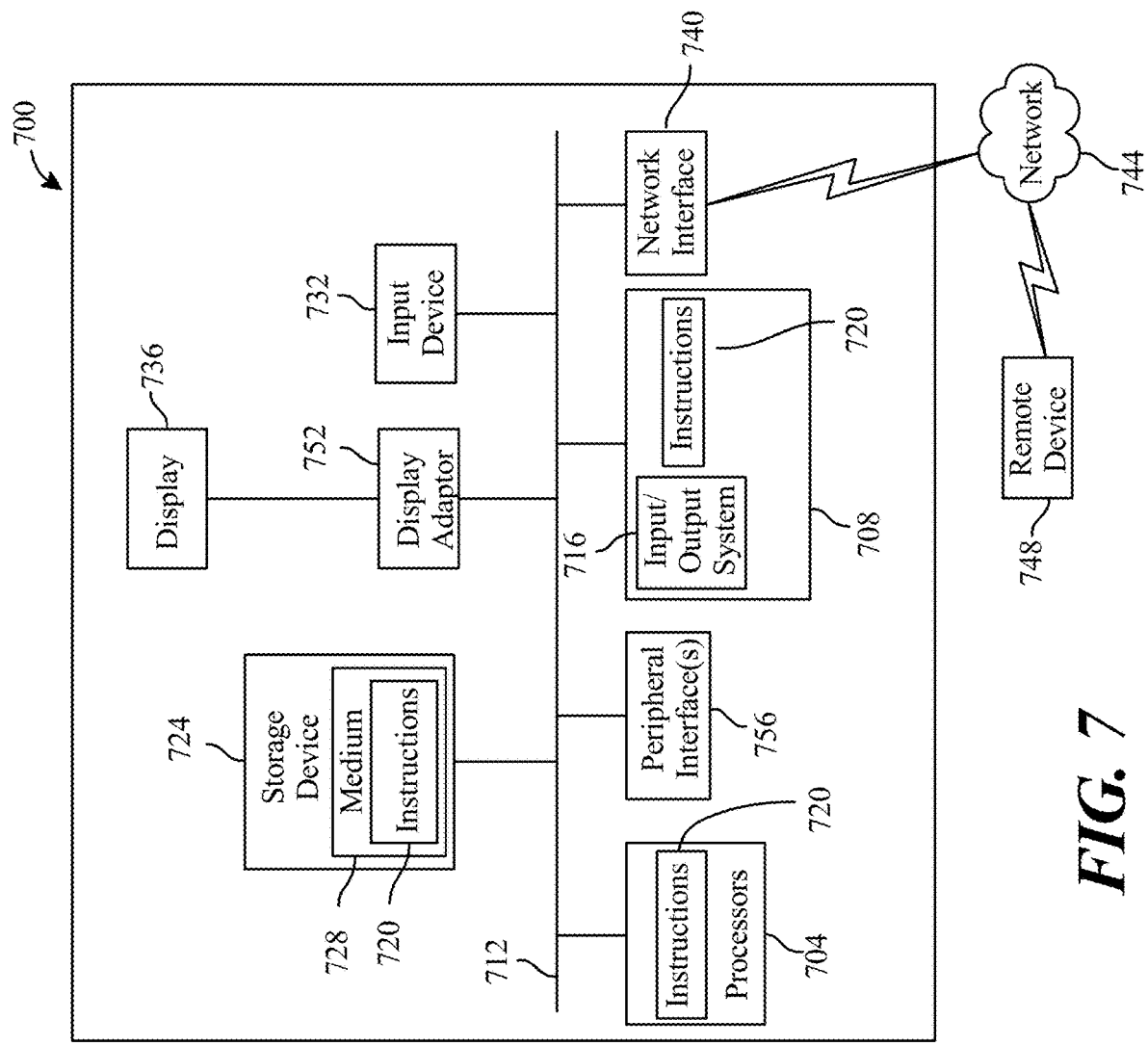
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for monitoring a battery system for powering propulsion on an electric aircraft, wherein the system comprises:
   at least a battery pack, wherein the at least a battery pack comprises a plurality of battery modules; and a pack monitoring unit (PMU) communicatively connected with the at least a battery pack, wherein the PMU comprises:
   at least a sensor, wherein the at least a sensor is configured to detect a battery datum;
   a controller communicatively connected to the at least a sensor, wherein the controller is configured to:
      receive the battery datum from the at least a sensor;
      detect a significant event as a function of the battery datum; and
      transmit an alert to a user interface.

2. The system of claim 1, wherein at least one of the battery modules comprises a battery cell comprising a flexible pouch containing an electrolyte therein.

3. The system of claim 1, wherein the controller is configured to generate an action command as a function of the significant event and perform the action command at the PMU.

4. The system of claim 1, wherein the controller is configured to transmit the alert to a remote user device.

5. The system of claim 1, wherein the controller is configured to transmit a datum describing the significant event to a data storage device.

6. The system of claim 1, wherein the at least a sensor comprises a heat sensor.

7. The system of claim 1, wherein the at least a sensor comprises a voltage sensor.

8. The system of claim 1, wherein the at least a sensor comprises a humidity sensor.

9. The system of claim 1, wherein the at least a sensor comprises a gas sensor.

10. The system of claim 1, wherein the PMU is integrated into the at least a battery pack.

11. The system of claim 1, wherein the at least a battery pack is communicatively connected to a module monitoring unit (MMU).

12. The system of claim 11, wherein the MMU includes a second sensor and is configured to detect a battery life cycle datum.

13. The system of claim 1, wherein the battery datum further comprises a battery health consideration.

14. The system of claim 1, wherein the battery datum includes a voltage.

15. The system of claim 1, wherein the controller is configured to store the battery datum in non-volatile local storage.

16. The system of claim 1, wherein detecting the significant event includes detecting that the battery datum is outside a predetermined range.

17. The system of claim 1, wherein detecting the significant event further comprises calculating the significant event as a function of a machine-learning model.

18. The system of claim 1, wherein transmitting the significant event triggers a shutdown protocol.

19. The system of claim 1, wherein the controller is communicatively connected to a flight controller.

20. A method for monitoring a battery system for powering propulsion of an electric aircraft, wherein the method comprises:
   detecting, using at least a sensor of a pack monitoring unit (PMU) communicatively connected with at least a battery pack, a battery datum, wherein the at least a battery pack comprises a plurality of battery modules;
   receiving, using a controller communicatively connected to the at least a sensor, the battery datum from the at least a sensor;
   detecting, using the controller, a significant event as a function of the battery datum; and
   transmitting, using the controller, an alert to a user interface.

21. The method of claim 20, wherein at least one of the battery modules comprises a battery cell comprising a flexible pouch containing an electrolyte therein.

22. The method of claim 20, further comprising generating, using the controller, an action command as a function of the significant event; and performing, at the PMU, the action command using the controller.

23. The method of claim 20, further comprising transmitting, using the controller, the alert to a remote user device.

24. The method of claim 20, further comprising transmitting, using the controller, a datum describing the significant event to a data storage device.

25. The method of claim 20, wherein the at least a sensor comprises a heat sensor.

26. The method of claim 20, wherein the at least a sensor comprises a voltage sensor.

27. The method of claim 20, wherein the at least a sensor comprises a humidity sensor.

28. The method of claim 20, wherein the at least a sensor comprises a gas sensor.

29. The method of claim 20, wherein the PMU is integrated into the at least a battery pack.

30. The method of claim 20, wherein the at least a battery pack is communicatively connected to a module monitoring unit (MMU).

31. The method of claim 30, wherein the MMU includes a second sensor and is configured to detect a battery life cycle datum.

32. The method of claim 20, wherein the battery datum further comprises a battery health consideration.

33. The method of claim 20, wherein the battery datum includes a voltage.

34. The method of claim 20, wherein the controller is configured to store the battery datum in non-volatile local storage.

35. The method of claim 20, wherein detecting the significant event includes detecting that the battery datum is outside a predetermined range.

36. The method of claim 20, wherein detecting the significant event further comprises calculating the significant event as a function of a machine-learning model.

37. The method of claim 20, wherein transmitting the significant event triggers a shutdown protocol.

38. The method of claim 20, wherein the controller is communicatively connected to a flight controller.

* * * * *